Figure 1:
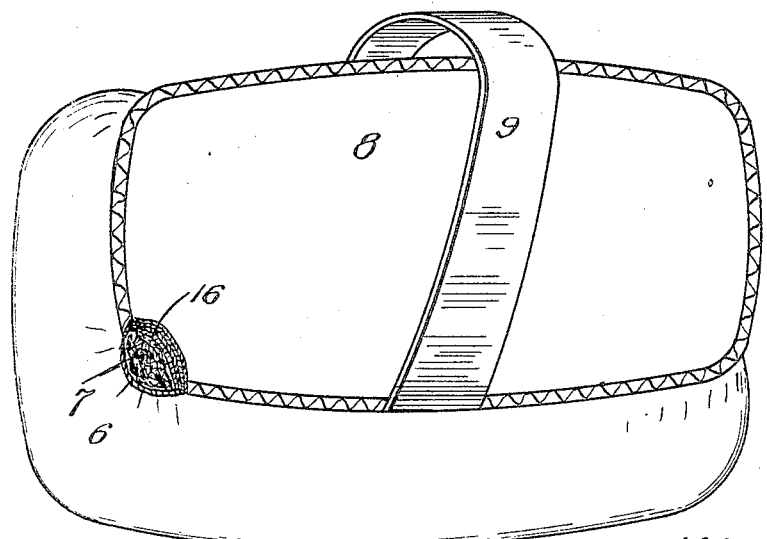

No. 813,092. PATENTED FEB. 20, 1906.
P. B. HARDY.
THERAPEUTIC PAD.
APPLICATION FILED OCT. 13, 1904.

Witnesses
M. A. Schmidt
Geo. E. Tew

Inventor
Piriam B. Hardy,
by Milo B. Stevens & Co.
Attorneys

UNITED STATES PATENT OFFICE.

PERIAM BURROWS HARDY, OF TECUMSEH, MICHIGAN.

THERAPEUTIC PAD.

No. 813,092.  Specification of Letters Patent.  Patented Feb. 20, 1906.

Application filed October 13, 1904. Serial No. 228,315.

*To all whom it may concern:*

Be it known that I, PERIAM BURROWS HARDY, a citizen of the United States, residing at Tecumseh, in the county of Lenawee and State of Michigan, have invented new and useful Improvements in Therapeutic Pads, of which the following is a specification.

My invention relates to an improved means of applying heat, dry or with desired substances, to the skin and other surfaces.

Hitherto the application of heat to the skin has been performed in various ways, such as by means of hot flannels, hot-water bags, hot-water bottles, and also by the well-known Japanese hot boxes, all of which had numerous disadvantages and drawbacks. By means of my invention these drawbacks are overcome.

My invention is to provide a device by which dry heat can be applied to the skin or to any other surface for numerous purposes either alone or to develop the action of any desired substance—such as finely-divided sulfur or wholly or partly volatile preparations, such as eucalyptus-oil, oil of wintergreen, and other embrocations.

My invention has a packing of asbestos in short fibrous, powdered, or any similar convenient forms, so as to form a pad having an external surface made of asbestos cloth in any suitable shape or form and of any suitable size and made sufficiently soft and pliable so that its application can be localized, as required, and the said pad can be made covered with asbestos cloth on the side to which heat is applied and the other side when desired may be made of or covered with other suitable substance, and when in the form requiring great heat a sheet of asbestos paper or other non-heat-conducting substance may be placed between the asbestos packing and the leather, wooden, metal, or other surface to prevent the heat injuring those substances and making the handle or part held in the hand too hot, and this will also prevent the heat escaping from the upper surface of the instrument and will force the heat upon the skin or other surface upon which it is desired.

My invention may be heated on the stove or range, in front of a fire, over the incandescent gas-burner, in a spirit flame, or in any other suitable way, the flame or heat causing no injury to the asbestos cloth or packing in any way.

When the asbestos fiber has incorporated with it anodyne substances, which are wholly or are partially volatile, this pad is a safe, convenient, and most efficient instrument for family use for relieving pain, as when the pad is heated the meshes of the asbestos-cloth covering permit the escape of the chemical vapor in a most effective form, and when not in use the said covering is so made as to prevent rapid deterioration of the medicament. Therefore as it does not deteriorate except when in use it becomes proportionately durable.

When my invention is made in the shape of a roller with a handle, it is provided with a solid core of metal or other non-combustible substance in order to give it sufficient rigidity to permit of its action as a roller, and then when heated embrocation or other suitable or similar substance may be spread or placed upon the skin or other surface and can be thoroughly rubbed in with great advantage by means of the said heated roller.

My invention when the pad has been impregnated with disinfectant or perfume can also be used as a deodorizer, disinfectant, or perfumer for the sick or other room by holding the pad over a spirit-lamp, gas-jet, or other flame. The vapors will be immediately driven off without the heat injuring the pad.

My invention can also be made in the form of a powder-puff, so that after having been heated the asbestos surface of the said puff-shaped pad can be pressed or rubbed on any part of the skin or face, as desired, such parts having, if desired, been covered first with any preparation or embrocation to which it is beneficial to apply heat. Again, my invention is such that any germs which may be deposited upon the pad will be quickly and with certainty destroyed, so rendering it aseptic, and it has also the advantage that there is no danger of the pad being applied too hot, and so avoids burning the surface upon which it is used.

Figure 2:
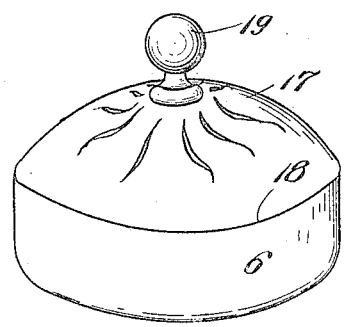
Figure 3:
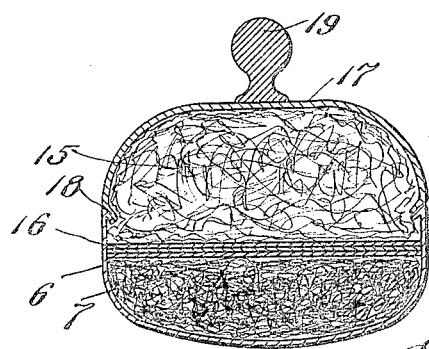

In the accompanying drawings, Figure 1 is a perspective view, partly in section, of what I have named a "neuralgia-pad." Fig. 2 is a perspective view, and Fig. 3 is a sectional view of a puff-pad.

In the drawings, 6 indicates a covering of asbestos cloth, and 7 the stuffing or filling of asbestos fiber. The construction shown in Fig. 1 has a backing 8, of silk cloth or similar material, and has a strap-handle 9. Under the backing 8 is a layer of several sheets of asbestos cloth 16 to prevent transmission of the heat.

In the form shown in Figs. 2 and 3 the filling 7 in the lower part of the pad is dense or short asbestos fiber, and the filling 15 in the upper part of the pad is asbestos wool or longer fiber, sheets of asbestos cloth, as indicated at 16, being interposed for the purpose above referred to. The upper cloth covering 17 is united at a seam 18 with the covering 6, and a handle 19 completes the device.

What I claim as new, and desire to secure by Letters Patent, is—

A pad having a filling of asbestos fiber and a covering of asbestos cloth, and sheets of asbestos paper in the body of the pad, between the face and back thereof.

In testimony whereof I have signed my name to this specification in the presence of two subscribing witnesses.

PERIAM BURROWS HARDY.

Witnesses:
J. H. SMITH,
H. V. WHITTIER.